(12) United States Patent  
Brown et al.

(10) Patent No.: US 7,775,724 B2
(45) Date of Patent: Aug. 17, 2010

(54) THRUST BEARING ARRANGEMENT

(75) Inventors: James Kevin Brown, Rock Hill, SC (US); George Crump, Fort Mill, SC (US)

(73) Assignee: Schaeffler KG, Herzogenaurach (DE)

( * ) Notice: Subject to any disclaimer, the term of this patent is extended or adjusted under 35 U.S.C. 154(b) by 1070 days.

(21) Appl. No.: 11/456,921

(22) Filed: Jul. 12, 2006

(65) Prior Publication Data
US 2007/0154122 A1 Jul. 5, 2007

Related U.S. Application Data

(60) Provisional application No. 60/698,343, filed on Jul. 12, 2005.

(51) Int. Cl.
*F16C 19/30* (2006.01)
(52) U.S. Cl. ........................... 384/597; 384/620
(58) Field of Classification Search ................ 384/590, 384/596, 597, 620
See application file for complete search history.

(56) References Cited

U.S. PATENT DOCUMENTS 3,999,816 A * 12/1976 Pitner .......................... 384/620
4,733,979 A    3/1988 Tsuruki

FOREIGN PATENT DOCUMENTS

DE            3643584        8/1987
WO       WO 03/067107   *  8/2003

* cited by examiner

*Primary Examiner*—William C Joyce
(74) *Attorney, Agent, or Firm*—Volpe and Koenig, P.C.

(57) ABSTRACT

A thrust bearing arrangement (2) is provided having a roller body cage (4) holding several roller bodies (6) and at least one race disk (8', 10"), with the race disk (8', 10") having a collar (12) axially surrounding the roller body cage (4) with play and on the opposite end a flange arrangement, which is directed in the opposite axial direction and in whose internal corner a component contacting the race disk (8', 10") can be centered. To avoid complicated processing of the peripheral edge of the contacting component facing the internal corner (22'), at least the leg (19', 27) of the internal corner (22', 30) forming the flange arrangement (18', 26) has a relieved inner contour for receiving the component to be centered in the corner region.

8 Claims, 1 Drawing Sheet

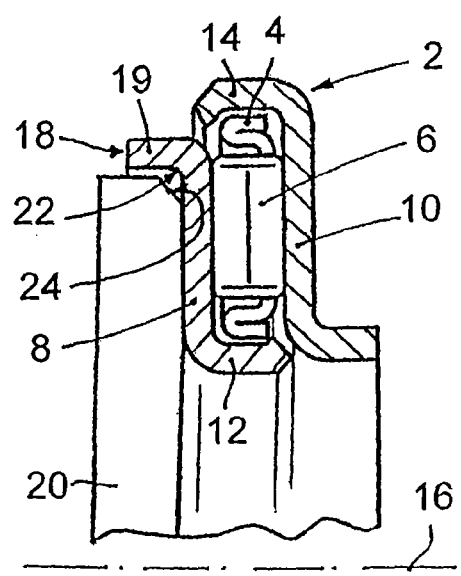
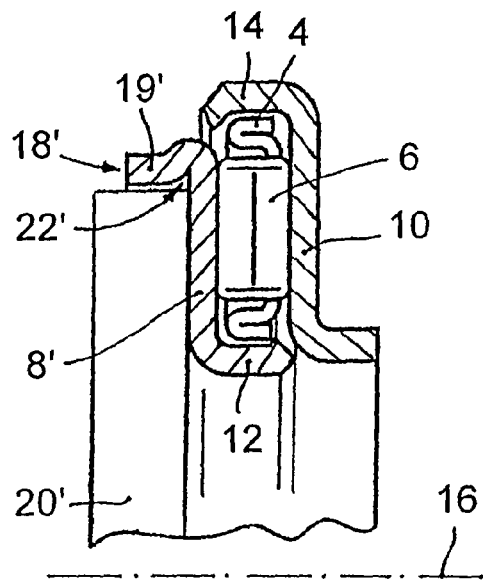
Fig. 1
(Prior Art)
Fig. 2
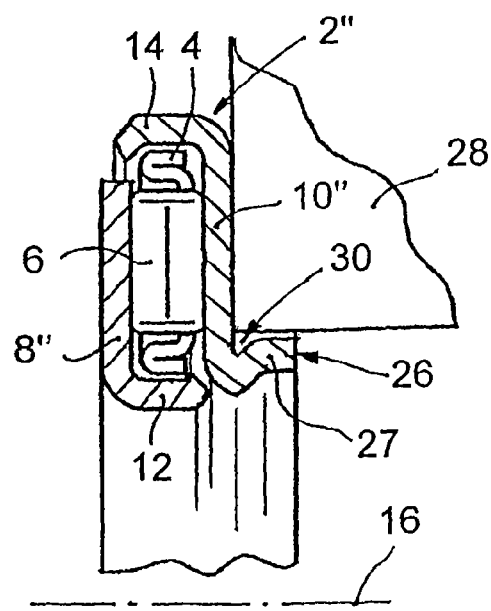
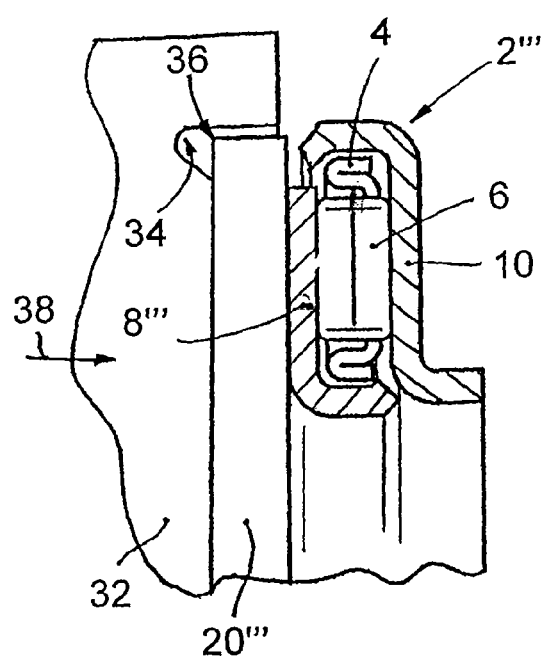
Fig. 3
Fig. 4
(Prior Art)

THRUST BEARING ARRANGEMENT

CROSS-REFERENCE TO RELATED APPLICATIONS

This application claims the benefit of U.S. Provisional application No. 60/698,343, filed Jul. 12, 2005, which is incorporated herein by reference as if fully set forth.

FIELD OF THE INVENTION

The invention relates to a thrust bearing arrangement comprising a roller body cage holding several roller bodies and at least one race disk, with the race disk having a collar axially surrounding the roller body cage with play and on the opposite end a flange arrangement, which is directed axially against the cage and in whose inside corner a component contacting the race disk can be centered.

BACKGROUND

Such thrust bearing arrangements are used to absorb axial thrust forces applied by a rotating component mounted in a housing or the like or to transmit these forces to the housing. A typical field of application is a rotating, axially loaded shaft mounted in a shaft housing or the like. Here, the axial thrust force is typically transmitted by a radially extending shoulder formed on and rotating with the shaft via a thrust bearing on a stationary radial shoulder formed on the shaft housing.

In general, the roller bodies do not roll directly on the radial shoulders of the shaft or the shaft housing, but instead on race disks, which are allocated to the thrust bearing and which are composed of a material that is especially suitable for the bearing function, for example, a hardened material, so that the bearing function is guaranteed independent of the material of the shaft or the shaft housing. For a thrust bearing arrangement with two race disks, typically one race disk with an axially projecting collar surrounds the roller body cage with play on the outer periphery, while the other race disk with a collar directed in the opposite axial direction surrounds the roller body cage with play on the inner periphery, which does not need to be discussed in further detail here and can be understood, for example, from FIG. 4.

It is also known to provide at least one race disk of a thrust bearing arrangement with another collar or flange arrangement bent away from the roller body cage s-parallel to the bearing axis, in order to center, for example, a spacing washer allocated to the thrust bearing arrangement relative to the thrust bearing or the thrust bearing itself relative to the shaft or to the shaft housing.

U.S. Pat. No. 4,733,979 describes and shows, for example, in its FIG. 1, a thrust bearing arrangement, for which on the inner periphery of one race disk, a collar is formed, by means of which a spacing washer allocated to the thrust bearing is centered on the inside. The spacing washer in general and the collar for centering on the race disk are obviously produced through pressing or drawing a sheet-metal component, wherein the internal corner formed by the collar has rounded internal contours. So that the outer edge of the spacing washer facing these rounded inner contours remains free from the inner contours, this outer edge must also be rounded or beveled, which means additional processing expense for the spacing washer.

DE 36 43 584 A1 shows especially in its FIG. 1B a thrust bearing arrangement, in which, in turn, on the inner periphery of one race disk an axially directed collar is formed, by means of which the thrust bearing arrangement is centered internally relative to a fixed component B. As can be seen from this figure, both the internal corner of the collar of the race disk and also the peripheral edge of the component B facing this race disk are illustrated with sharp edges. In general, however, if the race disk is produced, for example, by a stamping or pressing process from a sheet-metal part, the internal edge of the race disk is rounded, so that in practice, the peripheral edge of the component B is also rounded or must be beveled, so that the race disk on one hand and the component B on the other hand each contact one another in a statically determined way with the provided contact surfaces.

SUMMARY

The invention is based on the objective of creating a thrust bearing arrangement of the type noted above, in which expensive additional processing of a component centered on a race disk by means of an axially directed flange arrangement can be avoided with low technical expense.

The invention is based on the knowledge that opening up the internal corner of an axially directed flange arrangement of a race disk opposite the allocated outer edge of the component to be centered can be guaranteed with lower technical expense by means of corresponding shaping of the race disk.

The invention starts from a thrust bearing arrangement comprising a roller body cage holding several roller bodies and at least one race disk, with the race disk having a collar surrounding the roller body cage axially with play and on the opposite end a flange arrangement, which is directed axially against the cage and in whose internal corner a component contacting the race disk can be centered. According to the invention, at least the leg of the internal corner forming the flange arrangement in the corner region has a relieved inner contour for receiving the component to be centered.

Therefore, finishing work, such as rounding or beveling of the outer edge allocated to the internal corner in the component for centering can be avoided.

The flange arrangement can be provided in a known way as an annular flange extending continuously around the inner periphery or outer periphery of the race disk. According to another configuration, the flange arrangement is composed of several annular flange segments distributed in the peripheral direction, so that material and weight savings are possible without adversely affecting the function of the flange arrangement, as not shown in detail.

The flange arrangement can be arranged on the outer periphery and/or on the inner periphery of the race disk as explained with reference to embodiments. The flange arrangement according to the invention can be used, for example, for centering a spacing washer relative to the thrust bearing arrangement. Another conceivable use is to center the thrust bearing arrangement itself relative to a rotating or stationary component by means of the flange arrangement.

According to a configuration of the invention, which is especially simple and economical in terms of production, the race disk is a sheet-metal ring produced essentially in a stamping and deep-drawing process. This opens up the possibility to produce the open inner contours without an additional processing step, thus in the same processing step with the formation of the flange and collar for gripping over the roller body cage.

BRIEF DESCRIPTION OF THE DRAWINGS

The invention is explained in more detail below with reference to the attached drawings which show a few embodiments that were previously known as well as the invention. Shown therein are:

FIG. 1 is a schematic section view of a thrust bearing arrangement with a flange arrangement formed on a race disk for centering a spacing washer according to the state of the art;

FIG. 2 is a section view of an arrangement according to FIG. 1 with a flange arrangement embodied according to the invention;

FIG. 3 is a section view of a thrust bearing arrangement with a flange arrangement embodied according to the invention for centering the thrust bearing relative to a component; and FIG. 4 is a section view of a thrust bearing arrangement with a spacing washer centered outside the thrust bearing according to the state of the art.

DETAILED DESCRIPTION OF THE PREFERRED EMBODIMENTS

The thrust bearing arrangement 2 shown in FIG. 1 comprises a roller body cage 4, which is equipped with several cylindrical roller bodies 6, as well as a first race disk 8 and a second race disk 10, which are arranged in the axial direction in front of and behind, respectively, the roller body cage 4, and which hold the roller body cage 4 with radial play between themselves, and on which the roller bodies 6 roll. Collars 12 or 14, which are directed in the opposite axial direction and which grip over the roller body cage 4 on its inner periphery or outer periphery, are provided on the race disks 8 or 10.

A flange arrangement 18, which is bent away from the roller body cage 4 parallel to the bearing axis 16 and which is used to center a spacing ring 20 relative to the thrust bearing arrangement 2, is provided on the race disk 8.

As can be seen in FIG. 1, the flange arrangement 18 is formed by a pressing or drawing process on a sheet-metal part, with a rounded internal corner 22 being formed by the bent leg 19. So that the outer edge of the spacing ring 20 allocated to the internal corner 22 does not contact the internal corner, and so that a statically determined contact of the contact surfaces of the spacing ring 20 on one hand and the race disk 8 on the other hand designed for the axial force transmission is prevented, this outer edge is provided with a bevel or chamfer 24. This bevel or chamfer 24 requires a separate process. Because, for example, modern automatic transmissions have a plurality of such spacing rings equalizing production tolerances, this additional processing step is important for increasing production costs.

FIG. 2 shows a thrust bearing arrangement approximately according to FIG. 1, but with a configuration of the flange arrangement according to the invention. The components of FIG. 2 that are equivalent to FIG. 1 are provided with the same reference symbols and, if their configuration and function are the same as those in FIG. 1, they are not described again in detail. Components corresponding to FIG. 1 but modified in the sense of the invention are designated with the same reference symbols but provided with a prime.

As can be seen from FIG. 2, the leg of the internal corner 22' forming the flange arrangement 18' is shaped so that it has inner contours that are opened up or relieved relative to the spacing ring 20' in the corner region. These inner contours are produced, for example, in such a way that the leg 19' forming the flange arrangement 18' is bent by means of a drawing or pressing process through the use of corresponding outer contours of a molding plunger or the like.

The inner contours shown in FIG. 2 and forming the internal corner 22' enables the spacing ring 20' to be left unprocessed on the peripheral edge facing the internal corner 22', as can be seen from FIG. 2 without anything further. The internal corner 22' thus includes an axial surface of the leg 19', a radial surface of the race disk 8' substantially defining a right angle with respect to the axial surface, the radial surface extending outwardly beyond the axial surface, and an outwardly directed transition region between the axial surface of the leg and the radial surface that defines a triangular shaped undercut.

FIG. 3 shows a thrust bearing arrangement similar to FIG. 2, wherein, in turn, equivalent components in terms of FIG. 1 and FIG. 2 are provided with the same reference symbols. Components modified in the sense of the invention and with only a corresponding relationship to FIGS. 1 and 2 are characterized with the same reference symbols, but with a double prime.

A flange arrangement 26, which is bent away from the roller body cage 4 in the direction parallel to the bearing axis 16 and which is used to center the thrust bearing arrangement 2", for example, relative to a stationary component 28, is formed on the inner periphery of the race disk 10". The leg 27 of the race disk 10" forming the internal corner 30 is formed, for example, through pressing or deep-drawing by means of a molding plunger or the like provided with corresponding outer contours, as was already explained with reference to FIG. 2.

The inner contours shown in FIG. 3 and forming the internal corner 30 enables the peripheral edge of the component 28 to be centered facing the internal corner 30 to be left unprocessed, wherein it is guaranteed that the surfaces of the race disk 10" on one hand and the component 28 to be centered on the other hand provided for the axial force transmission contact each other in a statically determined way.

FIG. 4 shows a conventional thrust bearing arrangement, in which a spacing ring allocated to the thrust bearing is centered outside of the thrust bearing. The equivalent components in terms of FIG. 1 are characterized with the same reference symbols, while the components corresponding to FIG. 1 but embodied differently are characterized with the same reference symbols but provided with a triple prime. The thrust bearing arrangement 2''' comprises in turn a roller body cage 4, a first race disk 8''' and a second race disk 10, on which the roller bodies 6 roll.

A spacing ring 20''' contacts the first race disk 8'''. This ring is centered on a component 32, which is part of the overall construction and rotates, for example, with the rotating race disk 8''' and the contacting spacing ring 20'''. As can be seen from FIG. 4, the internal corner 34 formed on the component 32 is cut free through a relatively complicated process, so that the peripheral edge 36 of the spacing ring 20''' facing this internal corner is opened up or relieved, so that a statically determined contact of the contact surfaces of the component 32 on one hand and the spacing ring 20''' on the other hand transmitting the axial force is guaranteed.

Another disadvantage of the known arrangement shown in FIG. 4 is that the spacing ring 20''' centered on the component 32 is not visible in the assembly in the direction of the arrow 38 and must be mounted blind. For this case, a configuration according to the invention somewhat according to FIG. 2 enables the spacing ring 20''' to be centered on the thrust bearing for lower structural and production expense, where it is visible during assembly.

LIST OF REFERENCE SYMBOLS

2 Thrust bearing arrangement
2" Thrust bearing arrangement
2''' Thrust bearing arrangement 4 Roller body cage
6 Roller body
8 First race disk
8' First race disk
8" First race disk
8'" First race disk
10 Second race disk
10" Race disk
12 Axial flange
14 Axial flange
16 Bearing axis
18 Flange arrangement
18' Flange arrangement
19 Leg
19' Leg
20 Spacing ring
20' Spacing ring
20'" Spacing ring
22 Internal corner
22' Internal corner
24 Bevel or chamfer
26 Flange arrangement
27 Leg
28 Fixed component
30 Internal corner
32 Component
34 Internal corner
36 Peripheral edge
38 Arrow

The invention claimed is:

1. Thrust bearing arrangement comprising a thrust bearing and a component centered thereon, the thrust bearing including a roller body cage holding several roller bodies and at least one race disk with the race disk having a collar surrounding the roller body cage axially with play and at an opposite end a flange arrangement, which is directed in an opposite axial direction and in whose internal corner the component contacting the race disk is centered, at least a leg of the internal corner forming the flange arrangement has a relieved inner contour to receive a corner defined by an opening in the component, wherein the internal corner includes an axial surface of the leg, a radial surface of the race disk, the radial surface extending outwardly beyond the axial surface, and an outwardly directed transition region between the axial surface and the radial surface that defines a triangular shaped undercut.

2. Thrust bearing arrangement according to claim 1, wherein the flange arrangement is provided as an annular flange.

3. Thrust bearing arrangement according to claim 1, wherein the flange arrangement is composed of several annular flange segments distributed in a peripheral direction.

4. Thrust bearing arrangement according to claim 1, wherein the flange arrangement is arranged on an outer periphery of the race disk.

5. Thrust bearing arrangement according to claim 1, wherein the flange arrangement is arranged on an inner periphery of the race disk.

6. Thrust bearing arrangement according to claim 1, wherein the flange arrangement interacts with a spacing ring.

7. Thrust bearing arrangement according to claim 1, wherein the flange arrangement interacts with a guiding component centering the thrust bearing arrangement.

8. Thrust bearing arrangement according to claim 1, wherein the race disk is a sheet-metal ring produced in a stamping and deep-drawing process.

\* \* \* \* \*